United States Patent [19]

Stewart

[11] 4,340,033

[45] Jul. 20, 1982

[54] HEAT COLLECTING, UTILIZING AND STORAGE APPARATUS AND METHOD

[76] Inventor: James M. Stewart, P.O. Box 6161, Greenville, S.C. 29606

[21] Appl. No.: 17,410

[22] Filed: Mar. 5, 1979

[51] Int. Cl.³ .................................................. F24J 3/02
[52] U.S. Cl. .................................... 126/437; 126/400; 137/592
[58] Field of Search ............... 126/362, 400, 270, 271; 165/40, 174, 32, 485, 18, 104 S, 170; 122/35; 417/43; 137/592; 239/589

[56] References Cited

U.S. PATENT DOCUMENTS

| | | | |
|---|---|---|---|
| 1,979,732 | 11/1934 | Carson | 165/40 |
| 4,027,821 | 6/1977 | Hayes | 126/400 |
| 4,127,143 | 11/1978 | Zinga | 137/592 |
| 4,169,460 | 10/1979 | Popovich | 126/422 |

Primary Examiner—Albert W. Davis
Attorney, Agent, or Firm—Dority & Flint

[57] ABSTRACT

An apparatus and method is described and illustrated for maximizing the efficiency of a solar collector and the like as well as that of a liquid storage tank by maintaining the temperature of the liquid at the bottom of the tank at a relatively low point through the use of a temperature limiting valve which assures utilization of a major portion of the heat from the liquid by the load prior to transmission of the liquid below a predetermined temperature to a lower portion of the storage tank from which the liquid is again circulated as to a solar collector. Stratification is encouraged by introducing heated liquid from the collector to the storage tank at one or more raised positions, and by the use of velocity reducers such as are normally used to reduce turbulence, together with other temperature limiting apparatus which would limit the flow to high temperature liquid for efficient operation. Additional apparatus is described and illustrated for enhancing stratification and utilizing off-peak electric or other reliable power availability in connection therewith.

6 Claims, 2 Drawing Figures

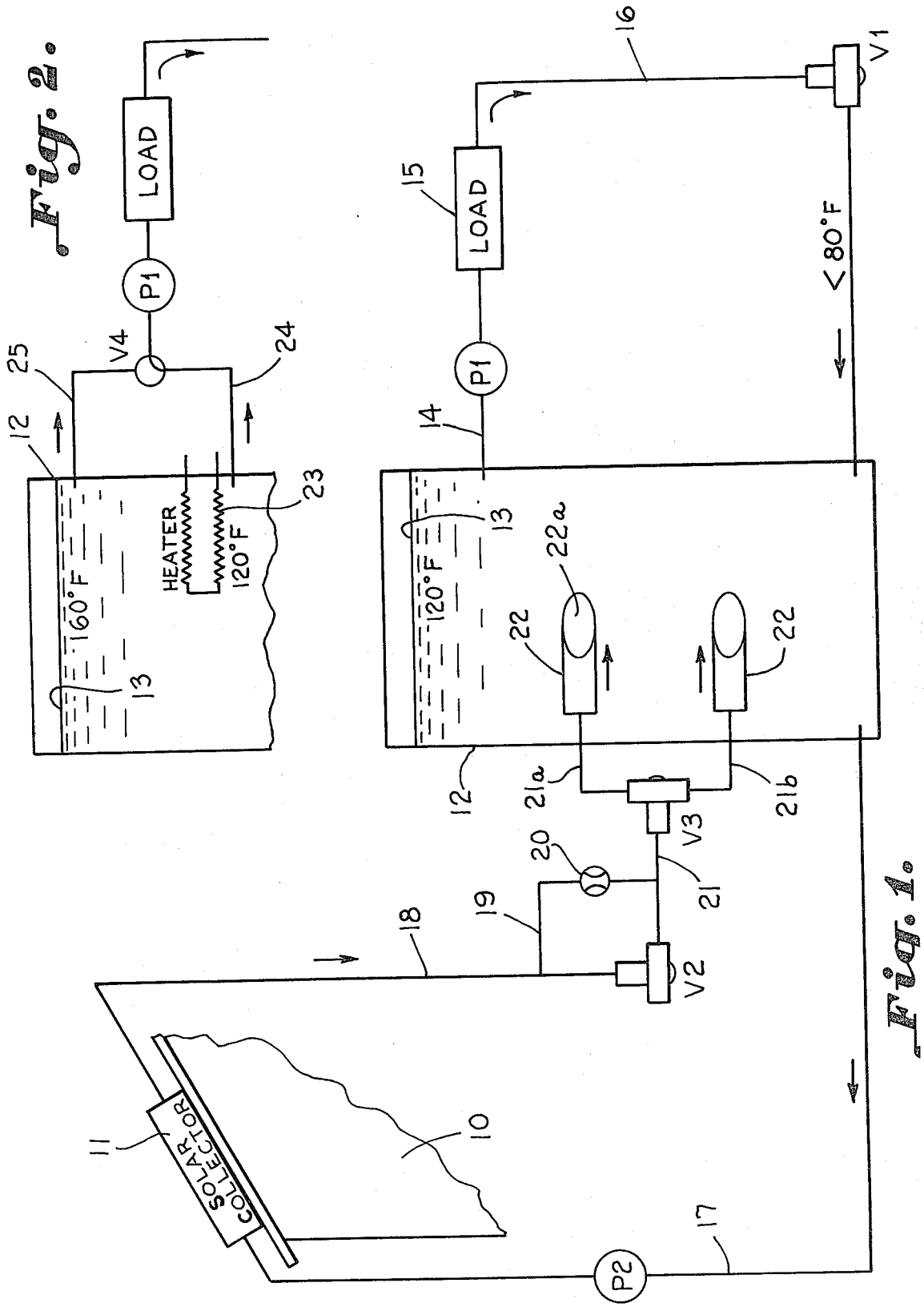

HEAT COLLECTING, UTILIZING AND STORAGE APPARATUS AND METHOD

BACKGROUND OF THE INVENTION

As will be observed herein the temperature of the liquid output from the collector and the efficiency of the collector and storage means is greatly increased through the use of strategically positioned temperature operated valves which control flow through the collector and which enhance stratification in the storage system assisted by the use of velocity reducers.

With conventional systems the head load may utilize only a portion of the heat content of the stored liquid as it passes through. Returning this water of intermediate temperature low into the storage tank tends to destroy stratification. By introducing a temperature operated valve after the heat load we can insure all available heat energy is removed in one pass, and when this low temperature liquid is returned low into the tank it enhances stratification. By throttling the liquid flow through the collector under marginal conditions for solar collection such as morning, afternoon, cloudy, or cold weather, with a second valve it is possible to get a more usable temperature and when conditions improve, the restricting effect produced by the throttling valve is removed and full flow is permitted to improve the efficiency of collection. The use of a third valve permits liquid from the solar collector, which is above a predetermined temperature, to pass in one direction to an upper strata of liquid within the storage tank but directs such flow to a lower strata if the temperature is below such predetermined value.

The problems addressed herein have been treated in a variety of generally more complex and expensive ways by the prior art. For example, commercially available electrical controls such as Hawthorne Industries H-1510-A sense water temperature and vary the speed of the pump motor to achieve usable temperature. U.S. Pat. No. 3,931,806 illustrates the use of a plurality of tanks in order to increase the efficiency of storage through maximizing temperature levels of the stored liquid. U.S. Pat. No. 4,021,895 illustrates the use of different collectors which deliver liquid in respect to varying levels in a storage tank. U.S. Pat. No. 4,027,821 illustrates sensing incoming water and utilizing another sensor within the tank to selectively determine the point at which the liquid will be introduced into the tank. Such systems are complex and expensive and the present invention contemplates simplification of apparatus and improved efficiency through sensing the temperature of the incoming water only so as to determine the temperature, the amount and the point of introduction thereof into the tank.

It is further contemplated that storage means may be provided utilizing a low cost heat source such as a solar collector which is backed up as by a heater disposed to heat the liquid in an upper portion of the storage tank and operated by a reliable but more expensive source such as off-peak electric power. By normally utilizing the liquid in a strata just below the heater, efficiency is improved since the higher temperature and more expensive heated water will remain at the very top and not be used until the usable energy in solar heated water is exhausted. This is in contrast to the prior art, as for example, U.S. Pat. Nos. 4,037,785 and 4,055,055 wherein liquid is always withdrawn from the top of the storage tank which results in utilization of electrically heated water even when adequately heated solar heated water is available at a slightly lower temperature.

SUMMARY OF THE INVENTION

When a solar collector is used to heat water in a storage tank, water is pumped from the bottom of the tank through the collector and then returned to the tank at a point near the top of the tank. By maintaining the temperature at the bottom of the tank at a low point, the efficiency of the solar collector is increased since the collector operates best at relatively low temperature. It has been found that this may be accomplished by utilizing a temperature operated valve to limit flow from the heat exchanger or other load into the bottom of the tank to water of a relatively low temperature. By thus limiting the flow to low temperatures water maximum utilization of the reasonably available heat energy in the water is thus assured, also increasing the efficiency of the storage tank. The use of a somewhat similar valve is common in refrigeration and the like to limit the fluid flow through the heat exchanger in order to control phase change, but the use herein is limited to the liquid phase to enhance stratification and utilization rather than its accustomed prior art usage to control phase change.

Moreover, under marginal conditions of collection such as inclement weather, it is desirable to reduce the flow of water through the collector so that a more usable high temperature water may flow therefrom. Under better conditions of collection a greater flow of water will increase the efficiency of collection. This may be accomplished by utilizing a temperature operated valve in the line from the collector to the tank. The temperature operated valve means may comprise a temperature operated throttling valve and a bypass which limits the flow when the temperature operated valve is closed.

Furthermore, it is desirable to return such high temperature water from the solar collector and the line to the storage tank in such a fashion that it will be introduced into the tank with minimized mixing near the stratification level normally occupied by water at such a temperature. By thus encouraging more stratification within the tank, the heat therein is more usable and the collection more efficient. This effect of stratification may be even more effectively utilized by providing velocity reducers at the desired point where the water is introduced into the tank. The velocity reducers contemplated herein are of the type employing a substantially horizontal pipe having an enlarged internal diameter with an end which may be so angled as to further increase the area for discharge. The use of such velocity reducers is common in hydraulic systems wherein reduction of turbulence is desired, but their use herein contemplates enhancing stratification through reduced velocity and turbulence rather than its accustomed prior art usage in hydraulic press systems and the like. Such velocity reducers may be used anywhere in the system to introduce liquid into the storage tank at low velocity with low turbulence to avoid mixing as would be a deterrent to stratification. Also because there is little velocity and turbulence, the liquid easily rises or sinks in the tank to a level determined by its temperature relative to the temperature of the stored liquid.

It is desirable that stratification be even further facilitated by introducing such heated water at multiple levels according to its temperature. This may be accomplished by utilizing a temperature controlled valve for directing water when above a predetermined temperature to an appropriate relatively high point in the tank, and for directing water when below a predetermined temperature to an appropriate relatively low point in the tank.

It has been found further that a storage means to provide continuous available heat energy stored in a liquid may utilize an intermittent low cost source such as a solar collector in conjunction with a reliable source such as off-peak electrical power. All heat energy available from the low cost source is best fully utilized first. A minimum of heat energy from the reliable source is used, so long as low cost derived heat is sufficient for requirements. Any other suitable source of low cost heat energy, such as for example waste steam and the like, may be utilized. Any other reliable source such as oil or gas may be used. Starting with the hottest available solar heated water, electrical heaters raise the water temperature in the upper portion of the tank. When off-peak electrical power is used, the temperature in the upper portion of the tank should be high enough, the highest contemplated herein, to provide energy throughout the off period. Initially solar heated liquid is drawn off from a low point, preferably below the heater at a stratification level generally just below the liquid heated by the electric heater. When the solar heated liquid is not adequate to supply the heat load, liquid is drawn off from the top. Thus, low cost solar heated liquid is utilized when available in preference to the liquid which has been heated by the electric heater. Suitable baffling may be used to reduce intermingling of the stratas of water.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a block diagram illustrating the solar collector, liquid storage tank and hydraulic components including valving utilized in connection therewith in accordance with the invention, and FIG. 2 is a portion of the block diagram described above modified to include an electric heater and valving for utilizing off-peak electrical power for delivery from an upper portion of the tank to the load.

DESCRIPTION OF A PREFERRED EMBODIMENT

Referring more particulary to the block diagram of FIG. 1, a building or any desired structure or device is designated at 10. A solar collector 11 is illustrated as being positioned thereon. A storage tank is illustrated at 12 having a liquid level 13 therein. A first line 14 carries liquid from near the top of the liquid storage tank and delivers same through a pump P1 to the load 15. The load may take the form of a radiator for example, or any other device which utilizes the heat energy contained within the liquid delivered from the upper portion of the tank by the pump P1. The liquid flows from the load through line 16 to a valve V1 which limits the liquid passed therethrough to that having a typical temperature of less than eighty degrees F., this temperature being determined by the requirements of the heat load. By virtue of the temperature limiting valve which may take the form of any suitable temperature operated valve, all of the heat which may be desirably removed is so removed and utilized by the load in a single pass. Stratification is promoted and maintained since the low temperature water is maintained at the bottom of the tank with other water moving up in the storage tank as the low temperature water is introduced adjacent the bottom at which point a velocity reducer as described above may be used to reduce mixing. A second line 16 delivers liquid from the load to the liquid storage tank at such lower portion and the temperature operated valve V1 is disposed therein. Thus, liquid is delivered to the liquid storage tank at a lower portion thereof only when the temperature of the liquid utilized by the load is reduced below a predetermined value. Means including a pump P2 in the line 17 delivers liquid from a lower portion of the storage tank to the solar collector 11. Thus, the efficiency of the utilization and storage of the liquid is increased and the efficiency of the solar collector is increased by reducing the temperature of liquid introduced thereto.

The valve V2 acts to throttle the collector by limiting the liquid delivered from the solar collector through the line 18 under marginal operation conditions. The liquid referred to throughout this application is generally water, but any other suitable heating means providing a similar function may be utilized. The liquid received by the valve V2 is passed therethrough only if its temperature is above a predetermined point otherwise the valve V2 being temperature operated is closed limiting flow to that which is passing through a bypass 19 which has a flow reducing or restricting valve 20 interposed therein. The liquid passed through the line 21 either from the valve V2 if open, or through the bypass arrangement, is delivered into the storage tank 12 at an elevated level so as to increase utilization as well as to promote stratification. Preferably, the liquid from the line 21 is introduced into the storage tank 12 through a suitable velocity reducer 22. The velocity reducers preferably assume the configuration of an enlarged substantially horizontal pipe section which may be truncated at the end at an angle which is illustrated in the form of the elipse as at 22a. When truncated, the cut-off must be substantially vertical. Such velocity reducers eliminate the need for expensive baffling in the line or tank which is often used in prior art configurations for purposes wherein mixing of liquids and the like would be avoided. Velocity reducers 21 may be used wherever water is introduced into tank 12.

In order to further assist stratification, the valve V3 is utilized. The valve V3 is a temperature operated valve which directs water or other liquid through the line 21a to an appropriate relatively high point in the tank if the water is above a predetermined temperature and to a relatively low point in the tank into the line 21b if the liquid is below a predetermined temperature.

All of these valves described thus far herein may conveniently take the form of a tempering valve Lawler Type 21 and 21-LT supplied by Lawler ITT. In the case of V1 and V2 one side or the other is plugged.

Referring more particularly now to FIG. 2, an immersion heater 23 has been positioned in an upper portion of the tank at which water at 120 degrees F. was illustrated above as being collected. The operation of the immersion heater 23 during off-peak periods permits the heating of the very upper strata of water as for exiting at a temperature of now 160 degrees F. Wrap-around and other heating means may be used.

A first line 24 carries the liquid from the tank at a level beneath the heater to the valve V4, whereas a second line 25 is utilized to carry the liquid to the valve V4 when electrically heated water is required by insufficient availability of heat in solar heated water. Suitable baffling (not shown) may be used to reduce intermingling of the water stratas.

When the primary thermostat (not shown) which controls the pump P2 calls for heat, as for exiting, to supply the radiator or other load, water is circulated from a strata of the tank which is lower or immediately below that heated by the immersion heater. If this low cost heat is not sufficient to carry the load, a secondary thermostat (not shown) set nominally, as for example two degrees lower than the primary thermostat, will actuate the valve V4 so that water from the top portion of the tank is used.

It is thus seen that the apparatus and method described herein makes possible maximum utilization of the solar collector as well as the storage means increasing the efficiency of both while conserving heated liquid which may be raised to elevated temperatures by more expensive expedients such as off-peak loading.

While a preferred embodiment of the invention has been described using specific terms, such description is for illustrative purposes only, and it is to be understood that changes and variations may be made without departing from the spirit or scope of the following claims.

What is claimed is:

1. Heat collecting, utilizing and storage apparatus comprising:
a heat collector for heating a liquid;
a liquid storage tank;
means connecting said heat collector and storage tank for liquid flow therebetween;
a first line carrying liquid from an upper portion of said liquid storage tank and delivering same to a load for utilization of the heat therein;
a second line delivering liquid from said load to said liquid storage tank at a lower portion thereof;
a temperature operated valve interposed in said second line permitting such delivery of liquid to said liquid storage tank only when the temperature of the liquid utilized by the load is reduced below a predetermined value through heat exchange therein; and
said temperature operated valve being operable in response to the temperature of said liquid to allow said liquid to be reduced to its lowest possible temperature as required by said load prior to re-entering said tank at said lower portion and strata thereof;
means pumping liquid from said lower portion of said storage tank to said heat collector;
whereby efficiency in the utilization of the heat collector is achieved through reducing the temperature of the liquid more efficiently prior to passage therethrough and thermal efficiency in the storage of said liquid is enhanced by efficient stratification of said liquid therein.

2. The structure set forth in claim 1 including velocity reducer means carried adjacent an end of said second line within said storage tank introducing said liquid of reduced temperature into said storage tank in a manner reducing admixing of said liquid with the stored liquid so as not to influence the temperature of the stratified liquid in said storage tank and the efficient utilization thereof.

3. The structure set forth in claim 1 including a temperature operated throttling means into which liquid is delivered from the solar collector at a limited temperature to a predetermined elevated point within the storage tank.

4. The structure set forth in claim 3 wherein the throttling means includes a temperature operated valve sensing the incoming liquid temperature and closing below a predetermined temperature and a restricted bypass through which liquid passes to the tank when said temperature operated valve is closed.

5. The apparatus of claim 1 including:
a heater operated by reliable low cost power disposed within said tank to heat said upper portion thereof;
a lower line passing from said tank from a position below said heater for delivering heated liquid to said first line;
an upper line above said heater receiving liquid from said tank for delivery of heated liquid to said first line; and
a second valve means selectively directing the liquid as between said lower and upper lines depending upon the availability of heat for introduction through said first line to said load and efficiently maintaining said liquid stratification in said tank.

6. The apparatus of claim 5 wherein said second valve means includes a temperature controlled valve delivering liquid through said upper line from said upper portion of said storage tank only when the temperature of said liquid below said heater is inadequate to satisfy requirements of said load;
whereby reliable low cost power is utilized in an efficient manner only as needed to maintain the temperature of said liquid in said upper portion and satisfy heating requirements.

* * * * *